United States Patent [19]

Litke

[11] Patent Number: 4,533,422

[45] **Date of Patent: * Aug. 6, 1985**

[54] THIXOTROPIC CYANOACRYLATE COMPOSITIONS

[75] Inventor: Alan E. Litke, Naugatuck, Conn.

[73] Assignee: Loctite Corporation, Newington, Conn.

[ * ] Notice: The portion of the term of this patent subsequent to Oct. 16, 2001 has been disclaimed.

[21] Appl. No.: 639,976

[22] Filed: Aug. 13, 1984

Related U.S. Application Data

[63] Continuation-in-part of Ser. No. 528,275, Aug. 31, 1983, Pat. No. 4,477,607.

[51] Int. Cl.[3] .......................... C08K 9/02; C08K 5/54; C09J 5/00; C09J 5/02

[52] U.S. Cl. .............................. 156/307.3; 156/331.2; 523/212; 524/533; 524/850

[58] Field of Search ................ 523/212; 524/533, 850; 525/295; 156/307.3, 331.2, 331.8

[56] References Cited

U.S. PATENT DOCUMENTS

| | | | |
|---|---|---|---|
| 3,876,605 | 4/1975 | Itoh et al. | 523/212 |
| 3,968,186 | 7/1976 | Tomaschek et al. | 156/331.2 |
| 3,969,309 | 7/1976 | Wright | 523/212 |
| 4,263,051 | 4/1981 | Crawford et al. | 523/212 |
| 4,335,035 | 6/1982 | Hatanaka et al. | 523/212 |
| 4,375,523 | 3/1983 | Hatanaka et al. | 523/212 |
| 4,381,248 | 4/1983 | Lazar | 156/331.2 |
| 4,396,678 | 8/1983 | Olson | 428/451 |
| 4,410,594 | 10/1983 | Olson | 428/447 |
| 4,418,165 | 11/1983 | Polmanteer et al. | 523/212 |
| 4,432,829 | 2/1984 | Bachmann | 156/307.3 |

FOREIGN PATENT DOCUMENTS

| | | | |
|---|---|---|---|
| 2078763 | 1/1982 | United Kingdom | 156/331.2 |

*Primary Examiner*—Herbert J. Lilling
*Attorney, Agent, or Firm*—Eugene F. Miller; Walter J. Steinkraus

[57] ABSTRACT

Cyanoacrylate compositions which employ fumed silicas treated with polydimethylsiloxane or trialkoxyalkyl silane are stable and exhibit an unexpectedly high thixotropic ratio. Such compositions are useful in adhesive applications or, when stabilized so as to prevent polymerization in contact with moisture, in latent fingerprint developing applications.

13 Claims, No Drawings

THIXOTROPIC CYANOACRYLATE COMPOSITIONS

CROSS REFERENCE

This application is a continuation-in-part of co-pending application Ser. No. 528,275, filed Aug. 31, 1983, now U.S. Pat. No. 4,477,607.

BACKGROUND OF THE INVENTION

Cyanoacrylate adhesives based on esters of α-cyanoacrylic acid have gained wide acceptance in recent years for a broad range of industrial consumer uses. The cyanoacrylate esters themselves, however, are very low viscosity liquids which makes the use of unfilled compositions difficult. Such compositions often migrate from the bondline or are absorbed into porous surfaces. Accordingly, there have been developed a variety of thickened cyanoacrylate adhesive compositions which incorporate organic polymers and/or inorganic fillers to reduce adhesive migration. Examples of such compositions are described in U.S. Pat. Nos. 3,607,542; 3,896,077, 4,012,840, 4,105,715, 4,180,913 and in Chemical Abstracts 89:117907c; 89:216475u; 91:40425c; and 92:95114b.

In the art of thickened cyanoacrylates it is sometimes desirable that the composition display thixotropic properties. Thus, under high shear conditions the composition can be processed and easily applied to the substrate but once applied, will display significantly reduced migratory tendencies. It is also well known that the inclusion of fumed silicas in many organic liquid compositions produces thixotropic effects. The use of such silicas has been reported in cyanoacrylate compositions.

At least certain of the prior art cyanoacrylate compositions employing fumed silicas have displayed stability problems, however. Thus U.S. Pat. No. 3,607,542 describes organically filled cyanoacrylate compositions in which fumed silica is an optional ingredient. These compositions are reportedly stable for only up to 4 hours. Furthermore, the same patent states that silica by itself does not readily mix with cyanoacrylate monomer to form a paste.

Cyanoacrylate formulations also occasionally find non-adhesive applications. Thus, for instance, the vapors of methyl and ethyl cyanoacrylates have found use for developing latent fingerprints in law enforcement applications. For such applications it would be desirable to develop a nonflowable form of cyanoacrylate monomer so that small open containers of the monomer can be placed throughout a room or automobile to release vapors without the danger of accidental monomer spillage. Desirably the thixotropic additives will also be kept to a minimum so as not to substantially reduce the monomer vapor pressure.

In certain applications it has been discovered that hydrophobic silicas produced by treatment of fumed silica with dimethyldichlorosilane can be used to give thixotropic cyanoacrylate compositions with improved stability. However, these fillers add cure retarding strong acid to the cyanoacrylate composition. Also, the thixotropic ratio of these silicas in cyanoacrylate esters (the ratio of apparent viscosity is measured under specified high and low shear conditions) is quite low. Therefore, when very high thixotropic effects are desired, such as when a pasty composition is desired, the amount of acid introduced by the silica can substantially reduce the cure time of the composition. Also, for latent fingerprint developing type applications, higher silica levels may result in lower monomer vapor pressures.

Commercially available fumed silicas are also known which have been treated with hexamethyldisilazine. It has been discovered that thixotropy ratios are also very low for these materials and that at least some of these materials tend to destabilize cyanoacrylate compositions. The destabilization effect is thought to result from residual ammonia or amine in the filler.

Accordingly there exists a need for a cyanoacrylate thixotrope, stable to the cyanoacrylate monomer, which has a significantly improved thixotropy ratio over dimethyldichlorosilane or hexamethyldisilazine treated silicas, and which does not adversely affect the fixture time of adhesive formulations.

SUMMARY OF THE INVENTION

The present application relates to cyanoacrylate compositions which employ fumed silicas treated with a polydimethylsiloxane or a trialkoxyalkylsilane as a thixotropic additive. It has been unexpectedly found that such silicas when incorporated into cyanoacrylate compositions do not adversely effect the stability of the composition, display a significantly higher thixotropy ratio than the previously mentioned treated silicas and, in adhesive compositions, do not adversely effect fixture time even at levels of about 10-12% where the compositions become pasty and very difficult to stir or apply uniformly.

The inventive compositions may consist primarily of an appropriately stabilized cyanoacrylate ester monomer and the specified silica at a level of between about 0.5 and 12% based on total composition weight. However, it is often preferred that a small amount of an organic polymer such as polymethylmethacrylate be dissolved in the monomer.

A preferred embodiment of the invention is a cyanoacrylate monomer formulation as described above in the form of a nonflowable gel. As used herein a nonflowable gel is one which will not move when extruded onto a vertical glass plate as a ⅛" diameter bead.

The inventive compositions are also useful in nonadhesive applications such as nonflowable latent fingerprint developing formulations.

DETAILED DESCRIPTION OF THE INVENTION

The α-cyanoacrylate monomers used in the inventive compositions are compounds of the formula:

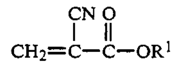

$$CH_2{=}C(CN){-}C({=}O){-}OR^1$$

wherein $R^1$ represents a straight chain or branched chain alkyl group having 1 to 12 carbon atoms (which may be substituted with a substituent such as a halogen atom or an alkoxy group) a straight chain or branched chain alkenyl group having 2 to 12 carbon atoms, a straight chain or branched chain alkynyl group having 2 to 12 carbon atoms, a cycloalkyl group, an aralkyl group or an aryl group. Specific examples of the groups for $R^1$ are a methyl group, an ethyl group, an n-propyl group, an isopropyl group, an n-butyl group, an isobutyl group, a pentyl group, a hexyl group, an allyl group, a methallyl group, a crotyl group, a propargyl group, a cyclohexyl group, a benzyl group, a phenyl group, a cresyl group, a 2-chloroethyl group, a 3-chloropropyl group, a 2-chlorobutyl group, a trifluoroethyl group, a 2-methoxyethyl group, a 3-methoxybutyl group and a 2-ethoxyethyl group. Most preferred are methyl, ethyl and 2-methoxyethyl cyanoacrylate.

Fumed silicas which have been found to impart desired thixotropic properties to the inventive compositions fall into two categories. The first, and most preferred, are polydimethylsiloxane treated silicas such as Cab-O-Sil N70-TS TM, sold by the Cabot Corporation. The silica has a carbon content of 5 weight percent and a surface area of $70M^2/gm$ according to the manufacturer. The product is the result of a process in which trimethylsilyl (TMS) terminated silicone fluid is absorbed onto the fumed silica and treated at elevated temperatures (about 200° C.). Some of the silanol groups on the silica are replaced by TMS terminated polydimethylsiloxane chains. Substantial silanol content, however, remains on the particle and the silicone fluid may be present predominantly as adsorbed silicone rather than as covalently bonded polymer fragments. An equivalent product is believed to be Aerosil R202 sold by Degussa.

The combination of stability and high thixotropy of the inventive compositions containing polydimethylsiloxane treated silicas is especially surprising because these silicas retain substantial amounts of surface silanol groups and because they have relatively low surface areas. Heretofore it had been observed that shelf stability was correlated with the degree of surface treatment so that silicas having the highest amounts of surface silanol generally gave the poorest shelf stability. Additionally, as is the case with other materials, high surface treatment gave much poorer thixotropic properties, and depending on the particular surface treatment, may not improve the shelf stability. Furthermore, low surface areas also correlate with poor thixotropic properties.

The second category of silicas usable in the inventive compositions are trialkoxy alkyl silanes. An example is Aerosil R805 TM, available from Degussa Corporation. Aerosil R805 TM, is a trimethoxyoctylsilane treated silica having a surface area of 150 $m^2/gm$.

The superior thixotropic performance of the inventive cyanoacrylate compositions is best obtained at silica levels of about 4–8%. These properties were demonstrated by comparative testing of an ethyl cyanoacrylate formulation containing 6% of a 0.4–0.5 million mw polymethylmethacrylate and 6% hydrophobic silica. The composition was stabilized with 5 ppm methanesulfonic acid (MSA) approximately 2500 ppm hydroquinone and 5 ppm $SO_2$. The formulations were prepared with the aforementioned Cab-O-Sil N70-TS TM and Aerosil R805 TM as well as 2-hexamethyldisilazane treated silicas (Tellenox 500 TM sold by Tulco, Inc. and Wacker HDK 2000 TM sold by Wacker-Chemie) and 3-dimethyldichlorosilane treated silicas (Aerosils R972 TM, R974 TM and R976 TM, all sold by Degussa). Table I gives the results of comparative Brookfield viscosity (70° F.) and acid level (calculated as ppm MSA) determinations.

TABLE I

| Comp. | Silica | Brookfield Viscosity 2.5 RPM helipath (spindle) | Brookfield Viscosity 20 RPM helipath (spindle) | Ratio 2.5/20 | Total Acid |
|---|---|---|---|---|---|
| A | Cab-O-Sil N70-TS TM | $2.9 \times 10^5$ (TE) | $4.2 \times 10^4$ (TE) | 6.9 | 27 |
| B | Aerosil R805 TM | $1.4 \times 10^5$ (TE) | $2.8 \times 10^4$ (TE) | 5.0 | 32 |
| C | Tellenox 500 TM | $4.4 \times 10^4$ (TE) | $2.1 \times 10^4$ (TE) | 2.1 | 26 |
| D | Wacker HDK2000 TM | $3.3 \times 10^2$ (TA) | $3.0 \times 10^2$ (TA) | 1.1 | 29 |
| E | Aerosil R972 TM | $1.2 \times 10^4$ (TC) | $3.8 \times 10^3$ (TC) | 3.2 | 38 |
| F | Aerosil R974 TM | $2.1 \times 10^4$ (TC) | $5.2 \times 10^3$ (TC) | 4.0 | 40 |
| G | Aerosil R976 TM | $2.6 \times 10^4$ (TC) | $8.1 \times 10^3$ (TC) | 3.2 | 39 |

As can be seen from the table, compositions A and B, which are within the invention, show higher low shear viscosity and substantially higher thixotropic ratios than compositions C-G which are not within the invention. It was also observed that, when unagitated, compositions A and B were nonflowable gels whereas compositions C-G were all ungelled and pourable.

The significantly higher acid numbers of compositions E-G is evidence that the dichlorosilane treated silicas do contribute strong acid to the cyanoacrylate formulations.

Both hexamethyldisilazane treated silicas had impractically low thixotropic ratios as shown by Table I. Furthermore, at least one of the hexamethyldisilazane treated silicas appears to destabilize cyanoacrylate monomers. Formulation C, which utilizes the Tellenox 500 TM silica polymerized in less than one day in a sealed tube at 82° C. while compositions A, B and D–G all lasted at least 15 days under the same conditions.

When a sample of a commercial polymer thickened ethyl cyanoacrylate adhesive, Loctite®Superbonder® 416, a product of Loctite Corporation, Newington, Conn., was compared for fixture speed, speed of cure, hot strength, heat aging, humidity resistance, and thermal cycling resistance, with a sample as in composition A except that stabilizer levels were 10 ppm MSA, 1000 ppm hydroquinone and 10 ppm $SO_2$, substantially equivalent results were obtained. Storage stability of the inventive product was in excess of 8 days in a glass tube at 82° C. The viscosity of the Superbonder® product was about 1600 cps whereas the inventive product was a thixotropic gel as in composition A.

It is generally preferred that the cyanoacrylate compositions of the invention include a minor amount of dissolved organic polymer. Suitable polymers include polyacrylates and polymethacrylates, polycyanoacrylates such as poly(ethylcyanoacrylate), and poly(vinyl acetate) polymers and copolymers. The organic polymers are preferably included within the range of approximately 1–15% of the composition by weight. Preferably, the organic polymers are included in the range of 3–10%. The inclusion of the organic polymer is recommended in order to prevent or significantly diminish the settling out of the silica from the inventive compositions. The compositions containing dissolved polymer are also observed to produce higher viscosities at equivalent silica concentrations and to recover thixotropic behavior faster after agitation than without dissolved polymers.

Other additives, conventional within the cyanoacrylate formulation art, may be included within the compositions of the invention without departing from the teaching hereof. Examples of such additives need not be specified since they are within the skill of those working in the art. See, e.g., U.S. Pat. Nos. 4,170,585, and 4,450,265, incorporated herein by reference.

As adhesives, the stable gel formulations of the invention are especially useful on porous substrates such as wood and ceramics which traditionally have been difficult to bond, in part because of adhesive migration from the bondline before cure. The gel holds the adhesive in the bondline until cure. The gel adhesive also provides significant safety advantages because even the prior commercial thickened cyanoacrylate adhesives could penetrate clothing when spilled, occasionally causing skin burns as the spilled monomer polymerized. The nonflowable gels of the invention will not penetrate ordinary clothing.

Gel adhesives for wood or other deactivating surfaces also preferably include about 0.1–2% of an accelerator compound such as the silacrown or calixarene additives disclosed in copending application Ser. No. 06/550,411, filed Nov. 10, 1983, and Ser. No. 06/575,257, filed Jan. 30, 1984, respectively. Preferred as 1,1-dimethylsila-17-crown-6, 37,38,39, 40,41,42hexa(2-ethoxy-2-oxo)ethyl calix[6]arene and 5,11,17,23-tetrat-butyl-25,26,27,28-tetra(2-ethoxy-2-oxo)ethyl calix[4]arene.

As mentioned above, it would be desirable for latent fingerprint developing applications to have a nonflowable form of cyanoacrylate with high vapor pressure. Gel compositions of the invention which have been stabilized to the point where they will not instantly polymerize on contact with moisture are especially useful for such applications. The gel form prevents spillage and the over-stabilization guards against bonding of fingers ("finger-stick") or other articles. A typical such formulation includes 88% methylcyanoacrylate stabilized with 0.2% methane sulfonic acid and 2500 ppm hydroquinone, 6% polymethylmethacrylate and 6% polydimethylsiloxane treated silica.

Gel formulations of the invention can also be used to support microfiber additives stable to the cyanoacrylate monomer, such as glass or untreated polyethylene fibers, which provide reinforced cured products. Because of the gel structure fibers can remain uniformly suspended in the composition for months. Thus, rapid curing cyanoacrylate monomer based molding and repair putty compounds are feasible.

From the foregoing it can be seen that the invention is not limited by the specific examples set forth above, the invention being limited only as set forth in the following claims.

I claim:

1. In a composition comprising an α-cyanoacrylate ester monomer and a thixotropic agent, the improvement comprising that said thixotropic agent is a fumed silica having a surface treated with a polydimethylsiloxane and is present in an amount of between about 0.5 and 12%.

2. A composition as in claim 1 comprising an organic polymer dissolved in said monomer.

3. A composition as in claim 2 wherein said polymer is selected from polyvinyl acetate polymers, polyacrylates, polymethacrylates and polycyanoacrylates.

4. A composition as in claim 1 having the consistency of a nonflowable gel, which will not move when extruded onto a vertical glass plate as a ⅛" diameter bead.

5. A composition as in claim 2 wherein said polymer is present at levels of between 1 and 15% by weight.

6. A composition as in claim 5 wherein said polymer is present at levels between 3 and 10% by weight.

7. A composition as in claim 6 wherein said polymer is polymethylmethacrylate.

8. A composition as in claim 1 wherein said silica is present in an amount between about 4 and 8% by weight.

9. A composition as in claim 8 wherein said silica is present in an amount of about 6% by weight.

10. A composition as in claim 1 wherein the α-cyanoacrylate monomer is a compound of the formula:

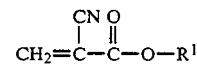

where $R^1$ is $C_{1-12}$ alkyl, $C_{1-12}$ alkyl substituted with a halogen atom or an alkoxy group, $C_{2-12}$ alkenyl, $C_{2-12}$ alkynyl, aralkyl or aryl.

11. A composition as in claim 10 wherein $R^1$ is selected from methyl, ethyl, n-propyl, isopropyl, n-butyl, isobutyl, pentyl, hexyl, allyl, methallyl, crotyl, propargyl, cyclohexyl, benzyl, phenyl, cresyl, 2-chloroethyl, 3-chloropropyl, 2-chlorobutyl, trifluoroethyl, 2-methoxyethyl and 2-ethoxyethyl.

12. A composition as in claim 11 wherein $R^1$ is methyl, ethyl or 2-methoxyethyl.

13. A method of bonding porous substrates comprising applying a composition as in claim 4 to at least one of said substrates and joining the substrates for sufficient time to permit the composition to cure.

* * * * *